March 15, 1960 M. G. PAWLEY 2,928,900

MULTICHANNEL PULSE MODULATED DATA TRANSMISSION SYSTEM

Filed Oct. 9, 1956 5 Sheets-Sheet 1

*INVENTOR.*
M. G. PAWLEY
*BY* [signatures]
ATTORNEYS

March 15, 1960 M. G. PAWLEY 2,928,900

MULTICHANNEL PULSE MODULATED DATA TRANSMISSION SYSTEM

Filed Oct. 9, 1956 5 Sheets-Sheet 2

INVENTOR.
M. G. PAWLEY
BY
ATTORNEYS

March 15, 1960 M. G. PAWLEY 2,928,900

MULTICHANNEL PULSE MODULATED DATA TRANSMISSION SYSTEM

Filed Oct. 9, 1956

5 Sheets-Sheet 3

INVENTOR.
M.G. PAWLEY

BY

ATTORNEYS

March 15, 1960 M. G. PAWLEY 2,928,900

MULTICHANNEL PULSE MODULATED DATA TRANSMISSION SYSTEM

Filed Oct. 9, 1956

5 Sheets-Sheet 4

INVENTOR.
M. G. PAWLEY
BY
ATTORNEYS

March 15, 1960 M. G. PAWLEY 2,928,900

MULTICHANNEL PULSE MODULATED DATA TRANSMISSION SYSTEM

Filed Oct. 9, 1956

5 Sheets-Sheet 5

INVENTOR.
M. G. PAWLEY
BY [signature]
ATTORNEYS

United States Patent Office 2,928,900

Patented Mar. 15, 1960

2,928,900

MULTICHANNEL PULSE MODULATED DATA TRANSMISSION SYSTEM

Myron G. Pawley, Riverside, Calif., assignor to the United States of America as represented by the Secretary of the Navy Application October 9, 1956, Serial No. 614,993

3 Claims. (Cl. 179—15)

(Granted under Title 35, U.S. Code (1952), sec. 266)

The invention described herein may be manufactured and used by or for the Government of the United States of America for governmental purposes without the payment of any royalties thereon or therefor.

This invention relates to a time division data transmission system and more particularly to an electronically commutated pulse-modulated data transmission system which is suitable for transmission of voice, music, telemetering, remote control, or other signals. The system is simpler, more flexible, and inherently more accurate than previously described systems for data transmission. It will be seen that the new data transmitter is readily adapted to produce pulse amplitude modulation (PAM), pulse width modulation (PWM), pulse position modulation (PPM), or pulse code modulation (PCM).

Previously described pulse-type data transmitters have effected time division by utilizing thyratron or hard tube counter chains to develop sequences of individual channel-synchronizing pulses. The latter pulses are then used to trigger corresponding individual pulse modulators (PAM, PWM, or PPM) which produce pulse modulation proportional to channel input voltage variation. This type of data transmitter becomes extremely complicated because in addition to requiring one or more tubes per channel in the counter chain for effecting time division, one or more additional tubes are required in each channel to produce pulse modulation in that channel. Additional diodes and tubes are required for isolation of stages, and for mixing of channel outputs to supply the repeating sequence or frame of modulated pulses to a radio transmitter or to a wire link when radio is not required. Even with simpler newly developed ring counter devices such as beam switching tubes, saturable reactors, or transistor counter chains, considerable complexity exists with added vacuum tubes or transistors for individual channel pulse modulators, gates, mixers, and pulse shapers. In other electronically commutated systems, as well as in the widely used frequency division data transmission systems, individual channels have different characteristics making it impractical to provide automatic calibration correction.

The pulse-modulated data transmitter of the present invention obviates these limitations by utilizing a ring counter chain to effect time division as in other systems, but with the important difference that the separate channel-marking pulses from the ring counter chain serve as gating pulses for the individual channel voltage inputs. When these gated signals are combined in a common mixing resistor there results a repeating sequence or frame of pulse amplitude modulated (PAM) signals in a form suitable for remote transmission. These pulse amplitude modulated signals may then be converted in a pulse modulation converter to pulse width modulated (PWM), pulse position modulated (PPM), or to pulse code modulated (PCM) signals. Only one pulse modulation converter is required in the present system for transmission of the multiplexed signal by radio or wire link in any desired form of output.

One object of the present invention is to provide a new data transmitter which is readily adapted to produce pulse amplitude modulation, pulse width modulation, pulse position modulation, or pulse code modulation and one which is simpler, more flexible, and inherently more accurate than previous systems for data transmission.

Another object of the present invention is to provide a new data transmitter which eliminates the vacuum tubes or other circuit elements required in the individual pulse-modulating stages and utilizes silicon diodes with characteristics largely independent of temperature variation in the gating and mixing circuitry.

A further object of the present invention is to provide a new data transmitter wherein the individual channel responses are essentially uniform and which permits automatic calibration correction if calibration voltages are continuously transmitted in one or more channels.

Still another object of the present invention is to provide a new data transmitter in which a composite pulse amplitude modulated signal may be converted to pulse width modulated, pulse position modulated, or to pulse code modulated signals and wherein only one pulse modulation converter is required for all channels, rather than a separate converter for each channel which made the prior data transmitters extremely complicated and impracticable, particularly in the case of pulse code modulation.

A still further object of the present invention is to provide an improved data transmitter wherein the number of channels may be extended without proportional increase in the number of vacuum tubes or other elements required.

Still another and further object of the present invention is to provide a new data transmitter which lends itself to transistorization because of the On-Off nature of its operation.

Other objects and many of the attendant advantages of this invention will be readily appreciated as the same becomes better understood by reference to the following detailed description when considered in connection with th accompanying drawings wherein.

Figure 1:
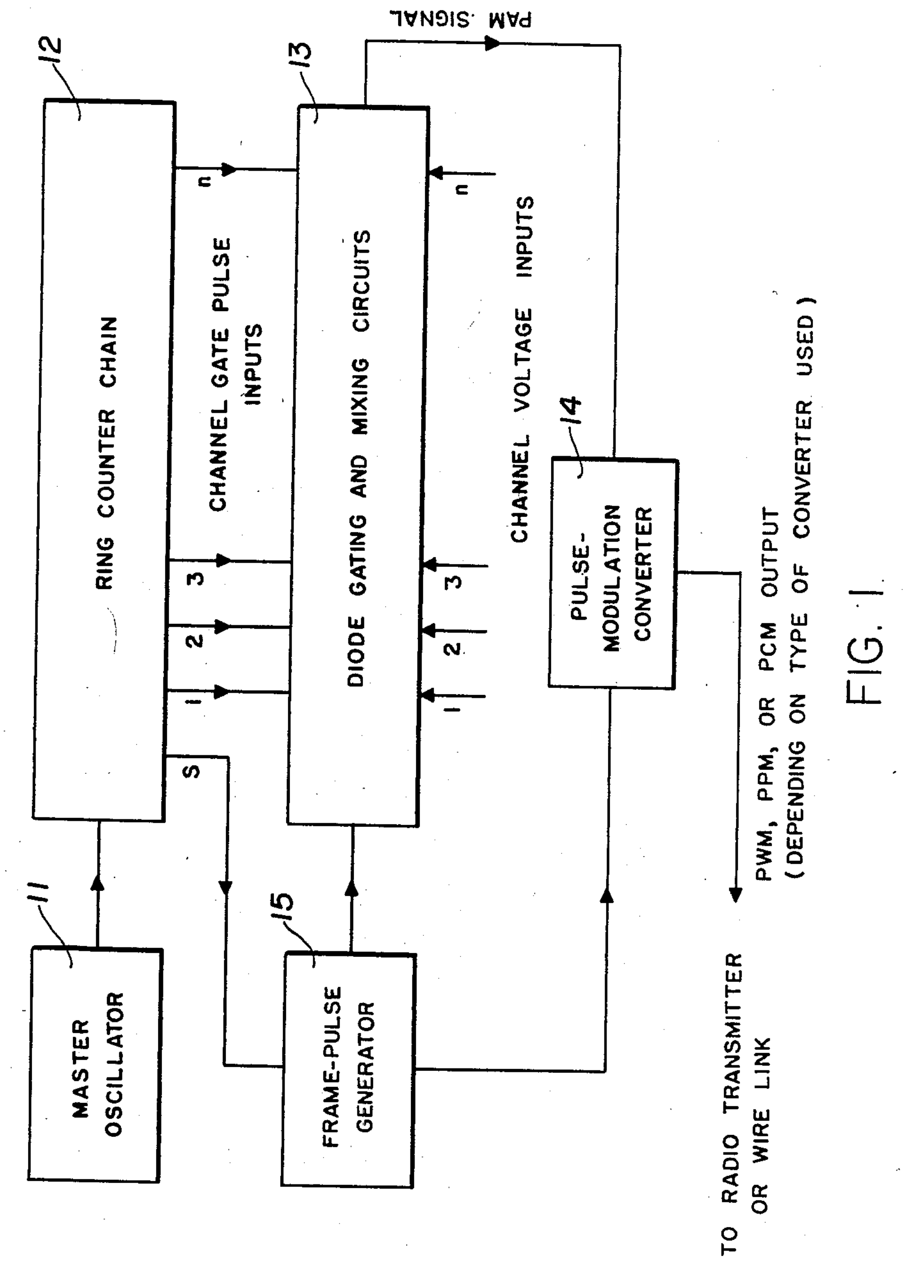
Fig. 1 is a block diagram illustrating one preferred embodiment of a pulse modulated data transmitter in accordance with the present invention.

Referring now to the drawings in detail, the coding and decoding processes will be explained with reference to Figs. 1 through 5. Novel features of the over-all system will be emphasized, but details will not be included for some of the components shown in the block diagrams, since these units may take any of a number of forms widely used in practice. For instance, the ring counter chain might utilize small saturable reactors in the manner described in the article, "Static Magnetic Storage and Delay Line," by An Wang and W. Woo, Journal of Applied Physics, vol. 21, pp. 49–54, January 1950 or transistors in place of vacuum tubes, or a special beam switching tube such as the "Trochotron," described in the article, "Trochotrons—A New Family of Switching Tubes," by H. Romanus and H. Alfven, Tele-Tech, June 1954 (section 2) pp. 94–96. The master oscillator, frame-pulse generator and pulse-modulation converter, as well as certain components of the decoder, will not be described in detail herein, since they also are conventional circuits which have been extensively used in practice.

*Encoding*

The block diagram of Fig. 1 illustrates one preferred embodiment of the encoder unit for the multichannel pulse-modulated data transmitter of the present invention. This unit switches the several channel input voltages successively at a rate determined by a stable master oscillator 11. The ring counter chain 12 which may have any one of a number of forms as previously mentioned, is stepped along by pulses from the master oscillator 11. For an *n*-stage ring counter chain there will be "*n*" channel terminals available, at each of which there will be a pulse continuing for the corresponding channel period. After the sequence of "*n*" pulses is completed, feed-back to the first stage of the chain causes the sequence or frame of pulses to be repeated at a sampling rate equal to the master oscillator frequency divided by the number of stages in the chain. The ring counter chain 12 thereby effects time division, and this data transmitter therefore is classified with the time division data transmission systems.

The diode gating and mixing circuits 13 function to receive the channel voltage inputs 1 through "*n*," and are gated by the channel gate pulse inputs "1" through "*n*" from the ring counter chain 12 to provide a multiplexed pulse amplitude modulated signal output which is applied to the pulse modulation converter 14 where the pulse amplitude modulated signal may be converted to a pulse width modulated signal, a pulse position modulated signal, or a pulse code modulated signal output depending on the type of converter used.

A frame pulse generator 15 is triggered by a gate pulse from the ring counter chain 12 and applies a frame pulse signal to the diode gating circuit to introduce calibrating signals when desired, and a frame pulse signal is also applied to the pulse modulation converter for indicating the beginning of a new sequence of channel outputs.

Figure 2:
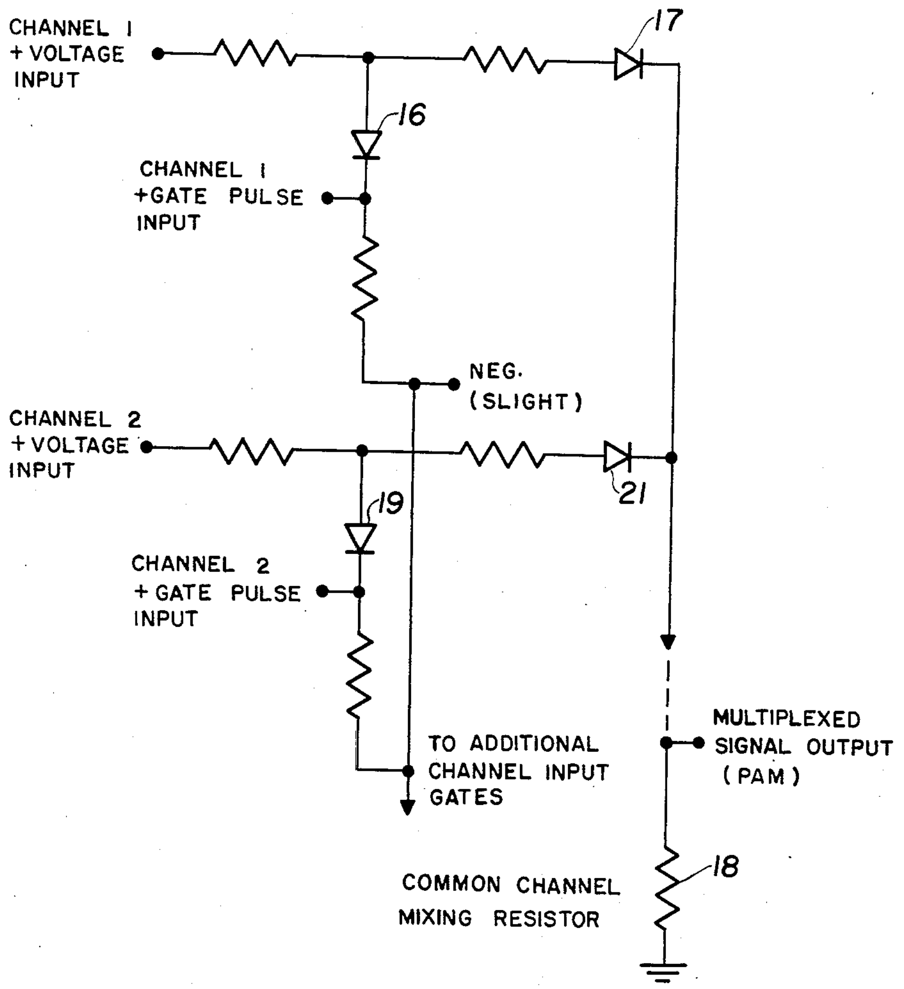
Fig. 2 is a schematic circuit diagram illustrating one preferred form of diode circuitry for gating and mixing individual channel input voltages to provide the repeating sequence or frame of pulse amplitude modulated channel pulses constituting the composite or multiplexed output signal.

The diode gating and mixing circuits may take various forms, and Fig. 2 shows simplified channel gating circuitry for two channels. Channel number 1 gate pulse from terminal number 1 of the ring counter chain 12 (Fig. 1) is applied to channel number 1 gate pulse input in the circuit of Fig. 2. Diode 16 is disconnected during the gate pulse and permits the channel number 1 voltage input to pass through diode 17 to the common channel mixing resistor 18. Similarly, channel number 2 gate pulse and channel number 2 voltage input are applied to the network containing diodes 19 and 21. Diodes such as 17 and 21 prevent reaction or "cross-talk" in other channels. When the gating pulse is Off, diodes 16 and 19 conduct preventing the channel input voltages from passing through diodes 17 and 21 to the common output resistor 18. The operation of the other channel gates is similar, the gates being triggered in a sequential manner from the ring counter chain 12, the multiplexed signal output appearing across the common mixing resistor R.

Figure 3:
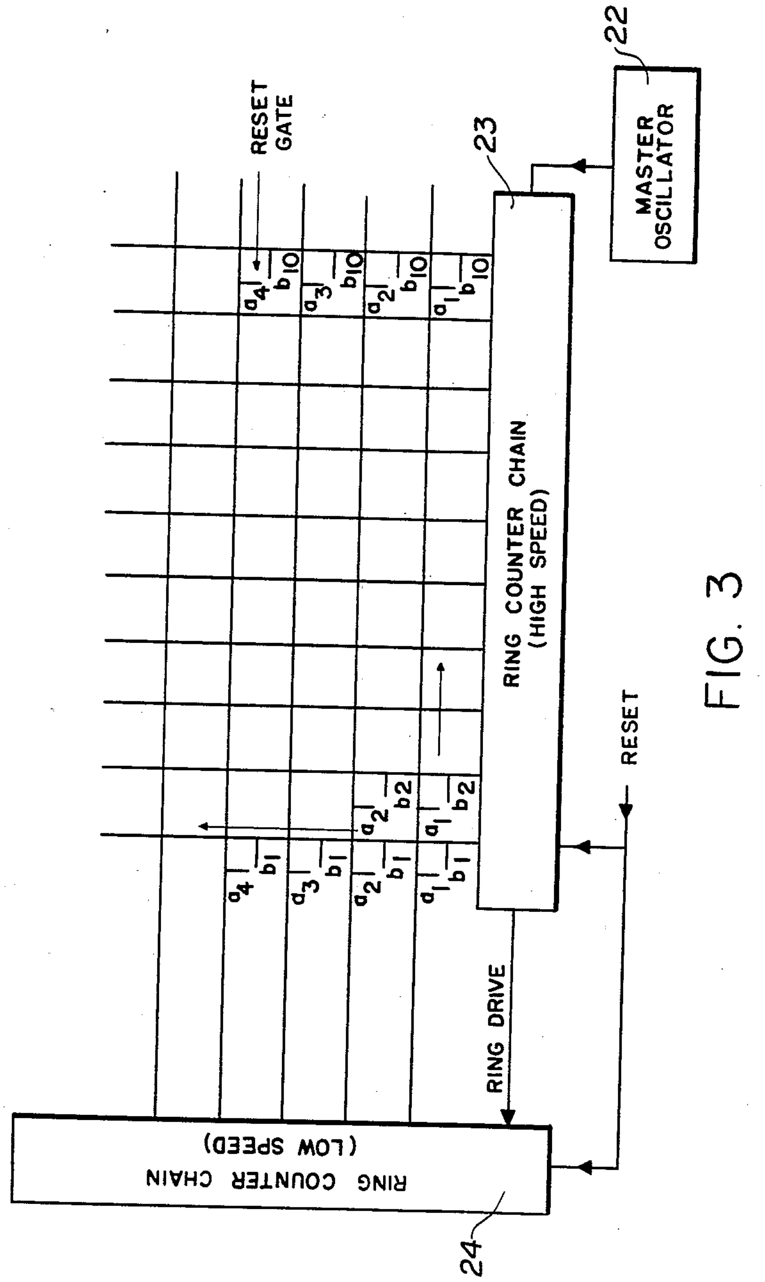
Fig. 3 is a schematic diagram illustrating an extension of the gating circuitry of Fig. 2 for application to a rectangular switching matrix in a 40-channel system.
Figure 4:
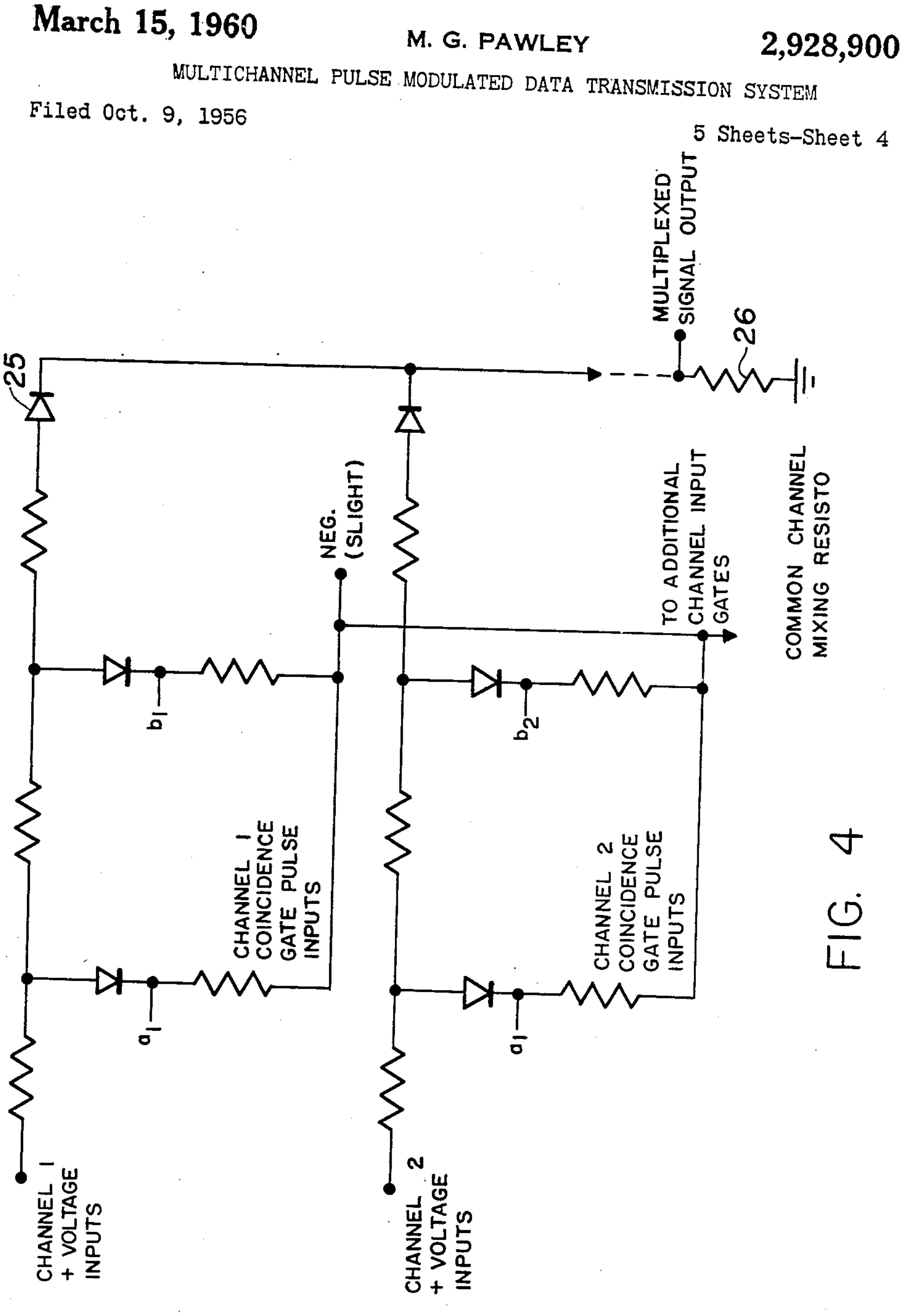
Fig. 4 illustrates in detail a preferred form of diode gating circuitry utilized in a portion of the matrix shown in Fig. 3.

Another form of the diode gating and mixing circuits 13 is illustrated in Figs. 3 and 4 which show a rectangular matrix switching arrangement and channel coincidence gating circuitry required when the single ring counter 12 does not include enough stages to accommodate the number of channels in the data transmitter. In the arrangement shown, pulses from the master oscillator 22 step the "high speed" ring counter chain 23 producing gating pulses in succession at terminals $b_1$, $b_2$ . . . $b_{10}$. During this period the gate pulse from the "low speed" counter chain 24 remains at terminal $a_1$. During coincidence of gate pulses at terminals $a_1$ and $b_1$ (Fig. 4) channel number 1 input voltage is gated through diode 25 to the common output resistor 26. Similar action takes place successively in the gating of channels, 1, 2 . . . 10. After the gates appear at terminals $b_{10}$, $a_1$, the "low speed" ring counter chain is stepped to produce a channel gate pulse at terminal $a_2$ coincident with a gate pulse reappearing at $b_1$ from the "high speed" counter chain. The coincidence of gate pulses at $b_1$ and $a_2$ gates channel 11 input voltage through to the common output resistor 26 shown in Fig. 4. This action continues with the successive gating of channel input signals for channels 11–20. The operation continues in this fashion until all 40 channels have been gated through to the common channel mixing output resistor 26. When coincident pulses appear at $a_4$, $b_{10}$, a reset pulse is generated which resets both ring counter chains and produces a frame synchronizing pulse which may be coded in special form, and mixed with the channel signals in the common output resistor 26. After all 40 channels have been gated, the cycle or frame repeats, thereby sampling all of the channels successively and repeatedly at a rate equal to the master oscillator frequency divided by the number of channels. A switching matrix may alternately be designed which utilizes two (or more) ring counter chains stepping at identical rates to provide multichannel gating.

A three-dimensional switching matrix could be utilized by adding a third ring counter chain (not shown) and additional diodes in the channel gating circuits. Binary counter chains can be utilized in place of ring counter chains with suitable connections from the counter stages to the matrix leads.

The composite or multiplexed pulse amplitude modulated (PAM) signal output from the diode gating and mixing circuits 13 is then converted to the desired form of pulse modulated signal in a pulse modulation converter 14. By well known techniques, the individual PAM signals may be converted to variable width pulses to produce pulse width modulation (PWM). If the variable width pulses are differentiated and the pulses corresponding only to the trailing edges are transmitted, there results a pulse position modulated (PPM) signal. Alternately, with added circuitry the successive variable width channel pulses may be used to gate a clock oscillator (not shown in Fig. 1), the pulses from which are then counted in a binary counter which is scanned serially to produce pulse code modulation (PCM). Other types of analog to digital converters may be utilized to convert the pulse amplitude modulated (PAM) signal to pulse code modulated (PCM) form. The advantages of the latter form of modulation lie in the inherent accuracy and freedom from noise effects in transmission once the input voltages are converted to digital coded form.

While a number of multichannel pulse modulated data transmitters have been designed utilizing ring counter chains or other means of effecting time division, it has been customary to connect a pulse modulator to each stage of the ring, subsequently mixing the several pulse modulated channel signals to provide a composite or multiplex output signal. This procedure multiplies the number of vacuum tubes and other elements used in each pulse modulator by the number of stages in the counter chain, and results in considerable complexity, certainly prohibitive when the individual pulse modulators are themselves complicated as in a PCM system.

As mentioned supra the new data transmitter obviates the need for separate channel pulse modulators, and thereby results in significant simplification in the data transmitter. This improvement has been made practicable with availability of silicon diodes which maintain very high back impedance at elevated temperatures. Germanium diodes are not satisfacory in the gating circuits because of the decrease in diode back impedance at high temperatures. Silicon diodes are preferably used to avoid adverse temperature effects; however, more complicated gating circuits may be utilized for improved performance, such as semiconductor bridge switching circuits. Vacuum tube diodes would add to the complexity of the data transmitter and lead to instability with variations in cathode emission and in characteristics of individual tubes. However, with silicon diodes, it becomes practicable to utilize a single pulse-modulation converter to sequentially modulate channel signals gated through the diode gates by the channel-marking pulses from the counter chain.

*Decoding*

Figure 5:
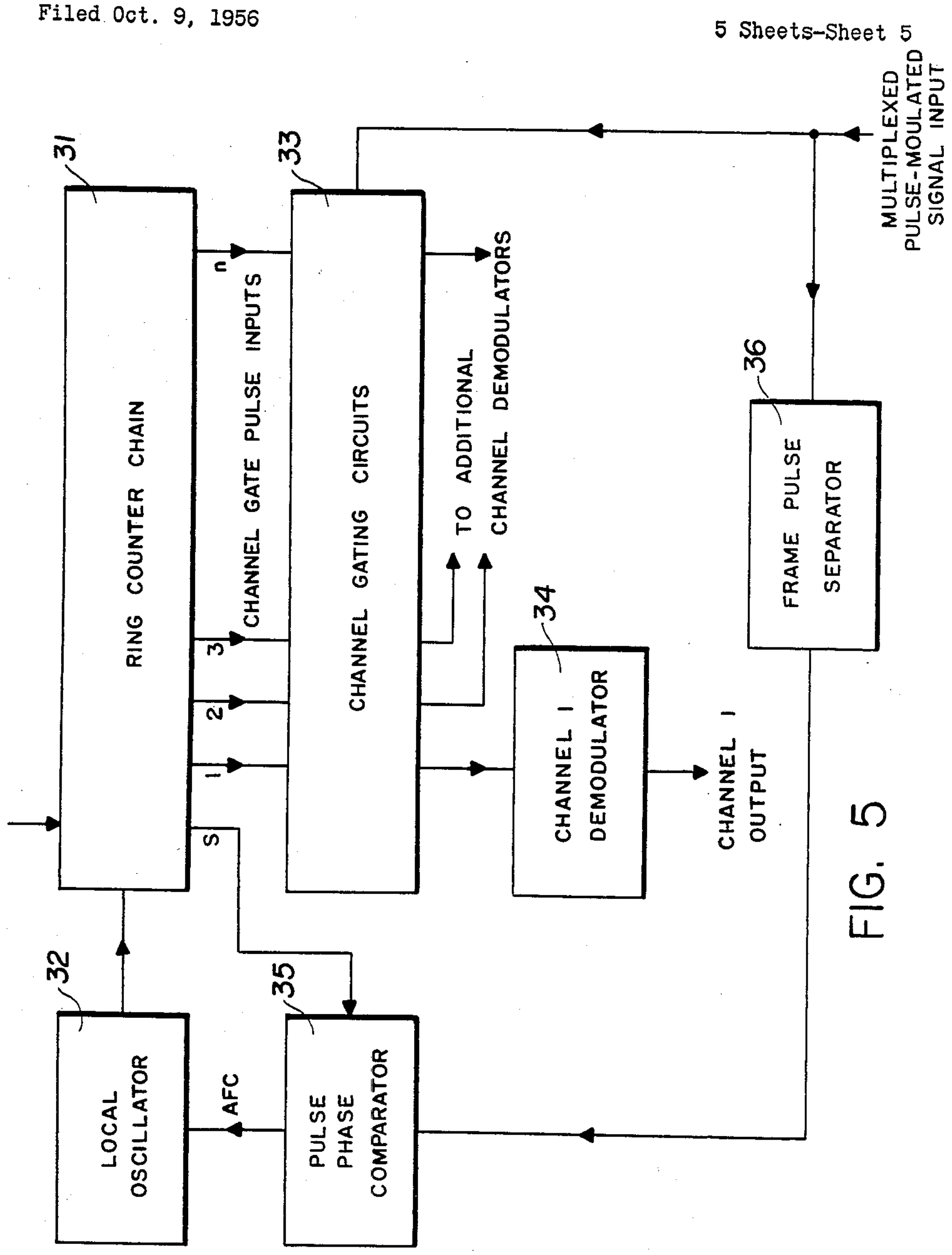
Fig. 5 is a block diagram illustrating one preferred embodiment of a decoder unit in accordance with the present invention for separating the channels and providing separate varying D.-C. channel outputs for monitoring, recording, remote control, etc.

One preferred embodiment of a decoder unit for use in conjunction with the data transmission system of the present invention is illustrated in Fig. 5 wherein the decoder utilizes a ring counter chain or a combination of counter chains as in the encoder unit. It is stepped by pulses from a local oscillator 32. The channel gate pulses from terminals 1, 2 . . . *n* are applied to the channel gating circuits 33 which sequentially gate the multiplexed pulse-modulated channel input signals to separate channel demodulators such as the one shown at 34 for converting the pulse-modulated channel signals to analog (varying D.C.) form for multichannel recording, monitoring, remote control, etc. Alternately, the individual channel signals may be recorded in PAM, PPM, or PCM form.

For proper synchronization of the ring counter chain 31 with the counter chain 12 in the encoder unit, automatic frequency control (AFC) is applied to the local oscillator from the pulse phase comparator 35. This is accomplished by comparing the phase of the frame "sync" pulse from one of the terminals, S, of the ring counter chain 31 with the phase of the frame pulse separated from the incoming multiplexed signal in the frame pulse separator 36. An error voltage from the pulse phase comparator 35 controls the local oscillator frequency, and maintains a frequency and phase lock with the signal from the master oscillator 11 in the encoder unit. This phase lock insures that the counter chains in the decoder and encoder will be maintained in synchronization, and that the individual channel demodulator outputs will be proportional to the corresponding channel input signals.

An important feature of the new telemeter lies in the feasibility for incorporation of automatic calibration correction in the system. This is possible because of the uniformity of response in the separate channels, a feature which does not exist in other electronically commutated data transmitters nor in the widely used FM subcarrier data transmission (telemetering) system. In the new data transmitter, automatic calibration correction is effected by continuous transmission in one or more channel intervals of zero reference and full-scale signals. Appropriate demodulators provide outputs which may be compared with reference voltages at the receiving station to develop "corrective" signals which continuously correct all of the channel responses to compensate for zero and sensitivity drifts in the system.

Obviously many modifications and variations of the present invention are possible in the light of the above teachings. It is therefor to be understood that within the scope of the appended claims the invention may be practiced otherwise than as specifically described.

What is claimed is:

1. A data transmission system comprising encoding and decoding units; said encoding unit comprising a master oscillator, a ring counter chain associated with said master oscillator, diode gating and mixing circuits adapted to receive a plurality of channel voltage inputs and a sequence of channel gate pulses from said ring counter chain for providing a multiplexed pulse amplitude modulated signal output, a single pulse modulation converter adapted to receive said pulse amplitude modulated signal from said gating and mixing circuits and provide a desired pulse-modulated signal output, and a frame pulse generator associated with said ring counter chain and adapted to receive a pulse therefrom at the end of each complete cycle and apply a frame pulse to said diode gating and mixing circuits and to said pulse modulation converter; said decoding unit comprising a local oscillator, a ring counter chain associated with said local oscillator, channel gating circuits adapted to receive said multiplexed pulse modulated signal and said channel gate pulses from said ring counter chain and provide a plurality of channel outputs, a demodulator connected to each of said channel outputs, a frame pulse separator adaptedt o receive said multiplexed pulse modulated signal input and separate therefrom the frame pulse, and a pulse phase comparator adapted to receive a signal input from said ring counter chain at the end of each cycle and said frame pulse and apply an automatic frequency control to said local oscillator for maintaining synchronization with said master oscillator.

2. In a data transmission system an encoding unit comprising a master oscillator, a ring counter chain associated with said master oscillator, diode gating and mixing circuits adapted to receive a plurality of channel voltage inputs and a sequence of channel gate pulses from said ring counter chain for providing a multiplexed pulse amplitude modulated signal output, a single pulse modulation converter adapted to receive said pulse amplitude modulated signal from said gating and mixing circuits and provide the desired pulse-modulated signal output, and a frame pulse generator associated with said ring counter chain and adapted to receive a pulse therefrom at the end of each complete cycle and apply a frame pulse to said diode gating and mixing circuits and to said pulse modulation converter.

3. In a data transmission system a decoding unit comprising a local oscillator, a ring counter chain associated with said local oscillator, channel gating circuits adapted to receive a multiplexed pulse modulated signal input and channel gate pulse inputs from said ring counter chain and provide a plurality of channel outputs, a demodulator connected to each of said channel outputs, a frame pulse separator adapted to receive said multiplexed pulse modulated signal input and separate therefrom the frame pulse, and a pulse phase comparator adapted to receive a signal input from said ring counter chain at the end of each cycle and said frame pulse and apply an automatic frequency control to said local oscillator for maintaining synchronization with a master oscillator.

References Cited in the file of this patent

UNITED STATES PATENTS

| | | |
|---|---|---|
| 2,408,077 | Labin | Sept. 24, 1946 |
| 2,445,775 | Grieg | July 27, 1948 |
| 2,497,411 | Krumhansl | Feb. 14, 1950 |
| 2,664,462 | Bedford et al. | Dec. 29, 1953 |
| 2,691,727 | Lair | Oct. 12, 1954 |
| 2,719,961 | Karnaugh | Oct. 4, 1955 |
| 2,724,017 | Heeren et al. | Nov. 15, 1955 |
| 2,736,772 | Burnight | Feb. 28, 1956 |